March 31, 1953     H. M. FLEMING, JR     2,633,402

MAGNETIC SPOT RECORDER FOR STATISTICAL DATA

Filed Dec. 16, 1950

INVENTOR
HOWARD M. FLEMING JR.
BY
George H. Lorch
ATTORNEY

Patented Mar. 31, 1953

2,633,402

UNITED STATES PATENT OFFICE 2,633,402

MAGNETIC SPOT RECORDER FOR STATISTICAL DATA

Howard M. Fleming, Jr., Orange, N. J., assignor to Monroe Calculating Machine Company, Orange, N. J., a corporation of Delaware Application December 16, 1950, Serial No. 201,207

11 Claims. (Cl. 346—33)

This invention relates to magnetic recording circuits and more particularly to a circuit arrangement for reversibly magnetizing the scanning head in a magnetic recorder so as to obtain spot magnetization along a peripheral path on a constantly rotating magnetic drum.

In electronic computers and similar equipment it is often required that spot magnetization be impressed upon a magnetic medium for storage purposes. It is desirable to space the spots of magnetization quite closely together and evenly. It is common practice to gate the signals that are to be recorded with very short pulses that are synchronized with respect to the rotation speed of the drum. The recording pulse intervals are of the order of microseconds.

For reasons of economy it is desirable to employ scanning heads which have but a single winding. Nevertheless, the information to be stored is usually required to be codified in such a way that certain spots of magnetization will have one polarity, or orientation of their magnetic poles, while other spots have reverse polarity.

It is an object of my invention to provide a circuit arrangement for reversibly magnetizing a scanning head without the use of more than one winding in such a head.

Another object is to provide the means for so energizing a scanning head as to make spot recordings which are closely spaced along the recording path of a magnetic drum, using signals of extremely abbreviated form.

Still another object is to provide a circuit arrangement for the purposes indicated above, which shall be economical to build and to maintain, and which shall have the minimum number of electron discharge tubes in the circuit itself.

Figure 1:
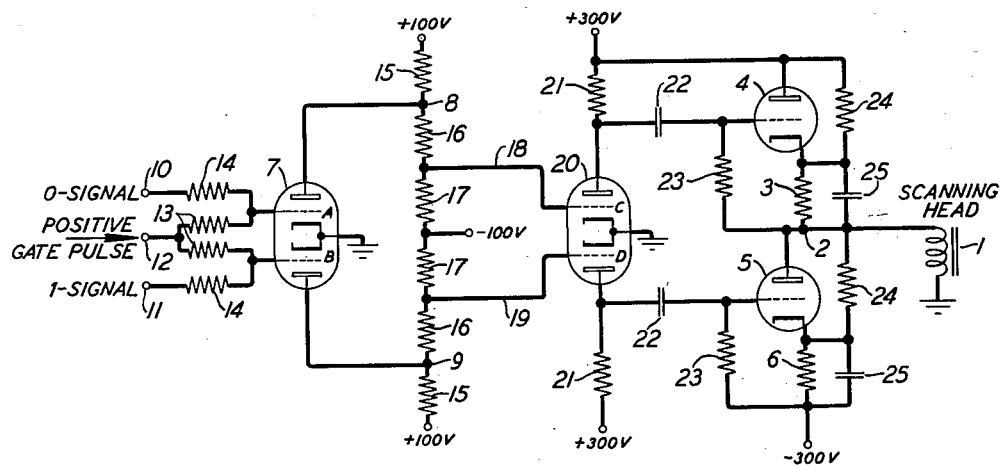
Figure 2:
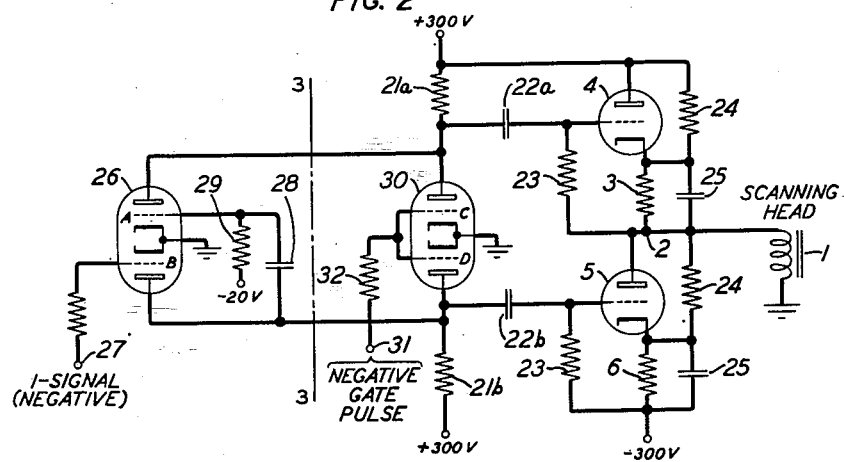
Figure 3:
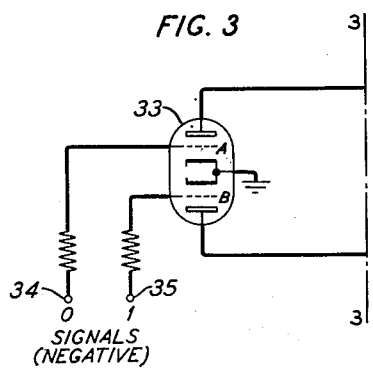

The foregoing objects, and others which will be made apparent in the specification to follow, are preferably carried out by the use of equipment, three illustrative embodiments of which are shown in the accompanying drawings. Figs. 1 and 2 are circuit diagrams which show two alternative ways of carrying out the invention. Fig. 3 shows how one portion of the circuit of Fig. 2 may be somewhat modified.

Referring first to Fig. 1, there is shown therein a scanning head 1 having one terminal grounded and the other terminal leading to a junction point 2 in a two-way circuit arrangement which includes two triode discharge tubes 4 and 5. These tubes are used for electronic switching purposes. Their space paths are effectively connected in series between the plus and minus terminals of a direct current source, these terminals being carried at +300 volts and —300 volts respectively with reference to ground potential. Junction point 2 and the anode of tube 5 are directly interconnected and would be at ground potential if both tubes 4 and 5 were to be driven to cut-off.

From the junction point 2 a resistor 3 makes connection to the cathode of tube 4. The cathode of tube 5 is connected through a resistor 6 to the minus terminal of said direct current source. The anode of tube 4 is connected to the positive terminal of the same source.

It will be apparent that tubes 4 and 5 if alternately driven conductive, may serve as a polarity reversing switch so as to feed current in either direction through the winding of the scanning head.

A twin triode tube 7 is shown having input terminals 10, 11, and 12, whereby dual control is to be exercised over each of its grids. The common cathode is grounded. The anodes are both supplied with a positive potential which is derived from junction points 8 and 9 respectively, on two voltage dividers. These voltage dividers are parallel-connected between positive and negative terminals of a direct current source. The potentials at these terminals are, for example, chosen as +100 v. and —100 v. respectively with reference to zero ground potential.

On the assumption that signals representing coded statistical data are to be injected into the control circuits of the tube 7, preparatory to the injection of a gate pulse of extreme brevity, input terminals 10 and 11 may be considered to be receptive of such preparatory code signals.

Terminals 10 and 11 will receive signals which may, for example, have a voltage swing between 0 and —20 volts.

The signals to be applied at input terminals 10 and 11 may be said to have a "walking beam" characteristic. That is to say, when their significance is binary digit zero, then terminal 10 will be at 0 volts while terminal 11 will be at —20 volts. Also, when binary digit "1" is to be recorded, then terminal 11 will be at 0-volts while terminal 10 will be at —20 volts. These voltages are to be applied reversibly and continuously, and so may, if desired, be derived from the output circuits of two cathode follower tubes (not shown), the latter being respectively controlled by the left and right anodes of a flip-flop tube stage. These signals may also be termed space and mark signals respectively.

In the circuit arrangement as shown in Fig. 1, the control signals for the statistical data items will need to be positive. The gate pulse input signals are also positive and they are applied to the terminal 12 which is connected through resistors 13 to both grids of the tube 7.

In the absence of a gate pulse, terminal 12 is to be held at —20 volts. Therefore the two space paths A and B in tube 7 will both be non-conductive. Only during the brief duration of a positive gate pulse will one or the other of these space paths A and B be driven conductive, depending on whether the 0-signal or the 1-signal is present at terminals 10 and 11. Terminals 10 and 11 are connected to their respective grids of tube 7 through resistors 14. Resistors 13 and 14 are preferably all of the same value, and it has been found that under practical operating conditions they may be of the order of 100,000 ohms.

When using a direct current source having terminals which are respectively +100 v. and —100 v. with reference to ground, it is found practical to adopt resistance values for sections 15, 16 and 17 of the voltage divider as follows:

| Section | Ohms |
| --- | --- |
| 15 | 18,000 |
| 16 | 47,000 |
| 17 | 65,000 |

The adopted values for components as given in the preceding paragraph enable tube 7 to be so controlled as to produce output voltages on the two output circuits 18 and 19 which are either of ground potential or substantially —20 v., depending upon the states of conductance and non-conductance which exist in the respective space paths of tube 7.

The output potentials derived from tube 7 are applied through conductors 18 and 19 respectively to two grids in a twin triode tube 20. This tube acts as an inverter with respect to the potentials derived from tube 7. Amplification is also provided by tube 20. Its anodes are supplied from the positive terminal of a 300 volt source through resistors 21. The common cathode is grounded. The anodes are coupled throuugh capacitors 22 to the grids in tubes 4 and 5 respectively.

In tube 4 the grid is normally held at ground or 0 volts, this being a negative bias with respect to the cathode, as obtained by a cathode resistor 3. In tube 5 the grid is normally held at —300 volts, this being a negative bias with respect to the cathode, as obtained by a cathode resistor 6. The two resistors 23 serve to maintain their grids at normal voltage levels. Resistors 24 are connected each in shunt with the space path of a respective tube 4 and 5. They are used to stabilize the voltage level of junction point 2 at ground potential when both of the tubes 4 and 5 are at the same time non-conductive. Capacitors 25 are connected in shunt with the cathode resistors 3 and 6 respectively.

In the operation of the circuit arrangement shown in Fig. 1, it will be assumed that the selective preparatory signals representing the coded data, and as applied to terminals 10 and 11, will be continuously present, and will select one of two alternatives. If the 0-signal exists, terminal 10 will be positive while terminal 11 will be negative. This potential will be reversed in the presence of a 1-signal. The application of the data signals alone is insufficient to produce conductance in either of the triode sections of the tube 7 because the grids are both held below cut-off by a normally negative potential applied to terminal 12 prior to the transmission of the gate pulse. The application of the gate pulse to terminal 12 is required to render one or the other of the two triode sections in tube 7 conductive. That is to say, if the 0-signal is to be recorded, a positive pulse applied to terminal 10 coupled with a positive pulse applied to terminal 12, will drive only section A of tube 7 conductive. The junction point between potentiometer sections 16 and 17 which is connected to output lead 18 will then be reduced to —20 v., and will cause the blocking of section C in tube 20.

In the same manner the application of a positive 1-signal to terminal 11 coincident with the application of a positive gate pulse to terminal 12 will produce conductance only in section B of tube 7, and thus will cause section D of tube 20 to be blocked.

Thus it will be seen that, depending upon which of the two anodes in tube 20 is raised to a high potential, one or the other of the tubes 4 and 5 will be driven conductive, and will pass current through the winding of the scanning head 1. The result is to polarize the recording of magnetization spots one way for 0-signals and the opposite way for 1-signals.

Referring now to Fig. 2, it will be seen that the scanning head 1 and the associated gate tubes 4 and 5 are the same as shown in Fig. 1. Their immediate circuit connections differ very slightly. A first stage of the control circuit includes a twin triode tube 26 which has a single external control circuit. If a 1-signal is to be recorded, then a negative (—20 volt) potential will be applied at terminal 27 and cause space path B in tube 26 to be blocked. The 0-signal is obtained by inversion of the 1-signal. It is represented by application of a 0-volt or ground potential to terminal 27 for driving space path B to a conductive state.

The space path A in tube 26 is normally blocked by a —20 v. grid bias applied through resistor 29. It is also controlled by gate pulses but indirectly according to the combined effects of the data signal and the gate signal. These effects result from concurrent conditions in the space path B of tube 26 and space path D in tube 30. The control of tube 30 should, however, be explained in more detail at this point. A subsequent explanation of the control of space path A in tube 26 will then be more understandable.

Tube 30 is a twin triode, the two space paths C and D of which are normally rendered conductive by the application of ground or 0-volt potential to the two grids. The gate pulse, of brief duration, is negative. It is applied at terminal 31 and through resistor 32 to both grids. One or the other of the two space paths C and D is driven to cut-off by the gate pulse, depending on the preparatory state produced in path B of tube 26.

Tube 30 has its anodes directly connected to corresponding anodes in tube 26 so that the anode potential in the upper sections of these two tubes is maintained the same. Such is also true of the anodes in the lower sections of these tubes.

Assuming that a 1-signal is to be recorded, the circuit of Fig. 2 operates as follows: Prior to the application of the gate signal the data signal has been applied at terminal 27 and causes triode section B in tube 26 to be cut off. Section A is normally cut off by the —20 v. bias on its grid.

Now the negative gate pulse is applied at terminal 31 and cuts off conduction in space paths C and D in tube 30. The gate pulse by inversion is also applied through capacitor 28 in a positive sense and produces conduction in space path A of tube 26. This counteracts the effect of the gate pulse in space path C of tube 30 because the anode therein cannot rise to a higher voltage than that of the anode of space path A. As a result, the grid in tube 4 remains unresponsive to the gate pulse. This is because there is no appreciable change in the potential drop through the common anode resistor 21a when space path conduction in section A is substituted for that in section C of the tubes 26 and 30 respectively. Tube 5, on the contrary, receives a positive gate pulse through capacitor 22b because the 1-signal and the gate pulse are jointly effective in producing a high anode potential on the anodes in sections B and D of tubes 26 and 30, respectively.

The action described in the foregoing paragraph as a response to a negative 1-signal is such that tube 5 switches current through the winding of the record head 1 in the proper sense to store the signal itself. Now the response to a 0-signal will be explained:

The 0-signal is positive as applied at terminal 27. Hence space path B is made conductive. Its low anode potential holds the anode of space path D in tube 30 to the same low level when conduction is stopped by the negative gate pulse applied to terminal 31. Furthermore, there is no appreciable change in the voltage drop through resistor 21b when conduction in space path B is substituted for that in space path D. Then, too, there is no positive pulse available for passage through capacitor 28 to the grid in space path A of tube 26. Therefore this space path remains cut off. The negative gate pulse, therefore, provides a full response when it cuts off conduction in space path C of tube 30. The anode potential therein rises and a positive pulse flows through capacitor 22a to the grid of tube 4. This tube when conductive switches current through the winding of the recording head 1 in the opposite direction from that previously described. In this case the 0-signal to be recorded provides the proper orientation of the magnetization spot on the revolving drum due to the flow of current through tube 4 and the winding of the scanning head in the opposite direction from that which obtains when tube 5 is rendered conductive.

Fig. 3 shows a modification which, in reference to Fig. 2, relates only to the arrangement of the first stage of the circuit arrangement. That is to say, tube 33 is substituted for tube 26. The dot-dash line 3—3 indicates that the modification is confined to the left of this line and that the same circuit to the right of the line 3—3 may be used in Fig. 3 as in Fig. 2.

Tube 33 is provided with individual grid control circuits from terminals 34 and 35 respectively, so that when the 0-signal is to be recorded a negative pulse will be applied to terminal 34 and at the same time a positive pulse will be applied to terminal 35. When the 1-signal is to be recorded the polarities above mentioned will be reversed.

The data signal sets the conductive and non-conductive conditions in the two sections of tube 33 according to the intelligence to be recorded and in anticipation of the gate signal. At the instant when the gate signal is applied, both of the space paths C and D in tube 30 will be blocked, leaving the determination of anode potential therein to be entirely controlled by the anode potentials in tube 33.

Now looking at Fig. 3 as though it replaced the corresponding portion of Fig. 2, it will be seen that at the instant when the gate pulse is applied to the grids of tube 30, even though both space paths are driven to non-conductance, the anode of section C will have the same potential as that of section A in tube 33. If it is high, as for response to a 0-signal, then tube 4 will be driven conductive. If it is low tube 4 will remain substantially blocked. The response to a 1-signal causes tube 5 to be driven conductive while tube 4 remains substantially blocked.

In conventional types of electronic computers a source of gate pulses is always provided in order that programming of the computer functions may be timed in proper sequence. It is unnecessary, therefore, to describe how these gate pulses may be derived. It is also to be noted that the signal pulses themselves may be variations of potential between 0-volts and —20 volts with respect to ground potential. Such values for the voltage swing of the signal pulses are not essential but they have been found in practice to be dependable when tubes of certain commonly preferred types are used.

In the above description it has been shown that three different alternative circuit arrangements may be adopted for carrying out the invention. Other modifications may be made by those skilled in the art without departing from the spirit and scope of the invention itself.

I claim:

1. A circuit arrangement for reversibly magnetizing a scanning head in a magnetic recorder, comprising direct current source terminals which are respectively positive and negative with reference to ground, switching means including two triode electron discharge tubes serially connected between said terminals and having a midpoint connection to the winding of said scanning head and thence to ground, this connection being through a cathode resistor to the cathode of one tube and also directly to the anode of the second tube, said switching means being operative to determine the sense of the polarization of said head when it is magnetized, and an electron tube device responsive to signals of complementary sense for controlling the grids of said switching means tubes selectively, thereby to obtain a flow of current through one or the other of said tubes and in series with the winding of said scanning head, thence to ground.

2. A circuit arrangement according to claim 1 and including at least one amplifier stage in circuit between the source of said signals and the grids of said tubes of the switching means.

3. A circuit arrangement according to claim 2 and including at least one polarization-determining input circuit arranged and adapted to establish conductance in a proper one of said tubes of the switching means, and a gate pulse input circuit arranged and adapted to abbreviate the timing of the magnetizing force as applied to said scanning head, said input circuits being jointly operative upon the one or more amplifier stages.

4. In a pulse recorder having a recording head arranged and adapted to scan a peripheral path on a constantly rotating magnetic drum, a single winding on said head, one terminal of said head being grounded and the other terminal having permanent circuit connections both to the cathode of a first switching tube and to the anode of a second switching tube, a direct current source the terminals of which are respectively positive and negative with reference to ground, the positive terminal being connected to the anode of said first switching tube and the negative terminal having a resistive connection to the cathode of said second switching tube, and means responsive to signals for controlling the grids of said switching tubes, thereby to render them alternatively conductive.

5. The combination according to claim 4 and including in the last said means at least one electron tube stage subject to dual control, one of the controls being a conditioning pulse which supplies the intelligence and the other control being a gate pulse which accurately times the energization of said recording head.

6. A concatenation of electron tube stages arranged and adapted to function as a switching circuit for reversibly energizing the winding of a magnetic recording head, the first of said stages being constituted as a dual discharge path electronic device subject to control by data signals, the second of said stages being constituted as a dual discharge path electronic device subject to common control of its two paths by gating pulses, and a third one of said stages being constituted as a pair of switching triodes which provide opposing paths of unilateral conductance in series with the winding of said recording head, an energy source suitably connected to the electrodes of all said tube stages, and control means operable to cause said switching triodes to be alternatively conductive in accordance with the intelligence to be recorded by said recording head.

7. The combination according to claim 6 and further characterized in that the anodes in the electronic device of the first stage are separately connected to corresponding anodes in the electronic device of the second stage.

8. The combination according to claim 7 and including a normally negative biasing means connected to one of the grids in the electronic device of the first stage and a capacitive coupling circuit connected between said grid and the interconnected anodes one of which is of the first stage and is unrelated to the space path in which said grid is situated.

9. The combination according to claim 6 and including a single circuit for application of input signals to a grid in the electronic device of the first stage.

10. The combination according to claim 6 and including input circuits for applying signals of complementary sense to two grids in the electronic device of the first stage.

11. An electronic switching device having two serially connected space paths, means including a signal source for limiting conductivity to one of said space paths and for determining which path is to be driven conductive, means including a source of timing pulses for causing the conductive stage in said device to be precisely timed and of extremely short duration, a scanning head arranged and adapted to produce spot magnetizations along a recording track, this head having a single winding connected from ground to a junction point between said two space paths and a power supply source for feeding current through said space paths according to the functioning of the first said means, also for reversibly energizing said scanning head.

HOWARD M. FLEMING, JR.

REFERENCES CITED

The following references are of record in the file of this patent:

UNITED STATES PATENTS

| Number | Name | Date |
|---|---|---|
| 2,436,829 | Roth | Mar. 2, 1948 |
| 2,529,666 | Sands | Nov. 14, 1950 |
| 2,535,303 | Lewis | Dec. 26, 1950 |
| 2,545,082 | Grosdoff | Mar. 13, 1951 |